Patented June 18, 1946

2,402,221

UNITED STATES PATENT OFFICE 2,402,221

PREVENTION OF CRAZING OF FLASH HEATED SHAPES OF POLYSTYRENE

Fred E. Wiley, Hartford, Conn., assignor to Plax Corporation, Hartford, Conn., a corporation of Delaware No Drawing. Application May 4, 1943, Serial No. 485,649

4 Claims. (Cl. 18—48)

This invention relates to the production of articles of polystyrene by processes which involve "flash heating" which term as used herein means an operation in which the polystyrene is superficially and momentarily heated to or above, usually substantially above, the transition temperature of the material which is about 180° F. Flash heating may occur in buffing, polishing or machining operations or through die drawing shapes of polystyrene in a highly heated die which may be heated to 580–600° F. Die drawing may be used to obtain articles of accurate shapes and dimensions and having a high polish.

Flash heating of shapes of polystyrene results in a skin effect which causes crazing or cracking.

I have discovered that crazing or cracking resulting from flash heating may be prevented by a certain heat treatment. This treatment involves heating the shape in a temperature range below the transition temperature for a certain period of time before flash heating, then immediately flash heating the shape, again heating the shape immediately after flash heating, preferably in the same way as in the initial heating operation, and then carefully cooling the shape to room temperature. This treatment prevents surface crazing and cracking of the shape during and after flash heating and also prevents permanent deformation or stretching of the shape which might occur if the heating should be conducted at a higher temperature and/or longer time.

It may be desirable to further treat the shape to mechanically stabilize it, as by heating the shape to or above the transition temperature, and then cooling it at a rate predetermined to produce in the shape a selected maximum stress which will permit machining the shape or will permit it to be used without cracking or failure.

Example

A rod of polystyrene is heated to a temperature of 140–170° F. for a period of time not less than approximately one-half the time necessary to attain uniformity of temperature throughout the shape within 1° F. The heating may be conducted in a bath of ethylene glycol or, in some cases, a water bath may be used provided the shape is not such and is not held in the bath long enough to cause slip planes to form therein. The shape is immediately flash heated after the initial heating thereof as by die drawing through a die heated to 580–600° F. Immediately after die drawing the shape is heated, preferably in the same way as in the initial heating thereof. The shape should not be allowed to remain out of the heating medium before and after flash heating any longer than is absolutely necessary, usually not more than 1½ minutes. After the second heating step, the rod is removed from the heating medium and allowed to cool to room temperature in air while protected from cold drafts.

From the foregoing it will be seen that I have provided a novel process for preventing crazing of articles of polystyrene which are subjected to flash heating.

The crazing of such articles and the prevention thereof by my novel process can be explained as follows. When a shape is flash heated without the use of the novel process, the superficial momentary heating produces a skin effect, the depth of which probably is but a few thousandths of an inch. Because of the fact that the flash heating is above the transition temperature, as explained above, a skin effect results, that is, a strain-free surface layer is formed on the cool and unyielding interior portion of the article, the temperature of which is much lower than the transition temperature, usually room temperature. Since flash heating is momentary, the surface cools and as it cools it shrinks, this shrinkage being resisted by the cool or cold interior. This creates tension in the surface layer and compression in the interior layer and the tension increases with the temperature drop. The thermal strains thus produced cause crazing.

On the other hand in my novel process, the plastic immediately below and inwardly of the surface layer is heated to a temperature of 140–170° F. A temperature in this range is sufficiently high to prevent the differential shrinkage which causes crazing when my novel process is not employed with flash heated shapes. The reason for this is that the surface layer first cools down only to the temperature of the underlying plastic and then both the surface layer and underlying plastic cool as a unit, the warm interior preventing the surface layer from cooling fast enough to cause crazing.

To accomplish this novel result, it is unnecessary to heat the article to a uniform temperature throughout its cross section in the specified temperature range before or after flash heating because the desired effect is obtained if a subsurface portion only is heated within said range. Also, it is unnecessary to employ a temperature as high as the temperature required for the removal of internal molding or thermal strains. Thus, the temperature range specified is below the temperature at which such strains are removed and this invention is limited thereto except that articles treated according to my novel process may also be treated to remove thermal strain without substantially relaxing molding strain and hence without substantial distortion thereof.

It will be understood that changes may be made in the above described procedure without departing from the scope of the appended claims.

Having thus described my invention, what I claim is:

1. The process of preventing crazing of a flash heated shape of polystyrene which comprises, first heating the shape for a substantial period of time at a temperature of approximately 140–170° F., flash heating said shape at a temperature substantially above the transition temperature of polystyrene, again heating said shape for a substantial period of time at a temperature of approximately 140–170° F., and cooling the shape to room temperature.

2. The process of preventing crazing of a flash heated shape of polystyrene which comprises, initially heating the shape for a substantial period of time but less than the time necessary to obtain uniformity of temperature throughout the shape and at a temperature not less than approximately 140° F. and less than the transition temperature of polystyrene, flash heating the shape at a temperature substantially above the transition temperature, again heating the shape within the range and for the time employed in the initial heating step, and cooling the shape to room temperature.

3. The process of preventing the crazing of a flash heated shape of polystyrene which comprises initially heating the shape at a temperature of approximately 140–170° F. for not less than approximately one-half the time necessary to attain uniformity of temperature in the shape within 1° F., flash heating the shape at a temperature above the transition temperature of the polystyrene, subjecting the shape to a heating medium maintained at a temperature within the range and for the time employed in the initial heating step herein recited, and cooling the shape to room temperature while protected from cold drafts.

4. The process of preventing the crazing of a flash heated shape of polystyrene which comprises initially heating said shape at a temperature of approximately 140–170° F. for not less than approximately one-half the time necessary to attain temperature uniformity in said shape within 1° F., immediately flash heating said shape to a temperature above the transition temperature of the polystyrene, immediately subjecting said shape to the temperature and for the time employed in the initial heating step, and cooling said shape to room temperature and while protected from cold drafts.

FRED E. WILEY.